United States Patent [19]

Seita et al.

[11] 4,107,097
[45] Aug. 15, 1978

[54] PROCESS FOR PREPARING POLYCATION-POLYANION ELECTROLYTE COMPLEXES HAVING CARBOXYLIC ACID AND ALKENYL RADICAL SUBSTITUENTS AND FILMS THEREOF

[75] Inventors: Toru Seita; Shunichi Asami; Akihiko Shimizu, all of Shinnanyo, Japan

[73] Assignee: Toyo Soda Manufacturing Co., Ltd., Japan

[21] Appl. No.: 741,469

[22] Filed: Nov. 12, 1976

[30] Foreign Application Priority Data

Nov. 21, 1975 [JP] Japan .................. 50-139196

[51] Int. Cl.² .............. C08J 5/22; B01D 13/04; A61F 1/24
[52] U.S. Cl. .............. 521/32; 260/29.6 WB; 427/54; 427/385 R; 427/390 R; 427/390 A; 260/886; 260/895; 204/159.14; 521/27; 521/28; 521/31
[58] Field of Search .......... 260/2.1 R, 895, 29.6 WB, 260/886; 427/54, 385 R, 390 R, 390 A; 204/159.14

[56] References Cited

U.S. PATENT DOCUMENTS

| | | | |
|---|---|---|---|
| 3,947,396 | 3/1976 | Kangas et al. | 260/29.6 WB |
| 3,963,662 | 6/1976 | Fujiwara et al. | 260/29.6 WB |

FOREIGN PATENT DOCUMENTS

2,412,092  9/1974  Fed. Rep. of Germany ....... 260/2.1 M

*Primary Examiner*—Joseph L. Schofer
*Assistant Examiner*—Peter F. Kulkosky
*Attorney, Agent, or Firm*—Oblon, Fisher, Spivak, McClelland & Maier

[57] ABSTRACT

Polymeric electrolyte complexes are prepared by reacting at least one polymer represented by one of the following formulas:

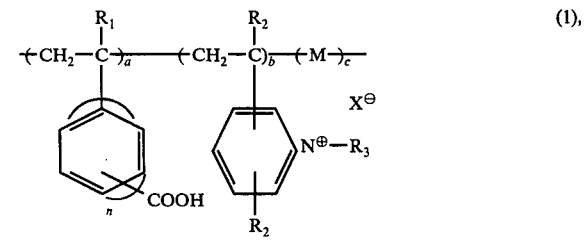

(1),

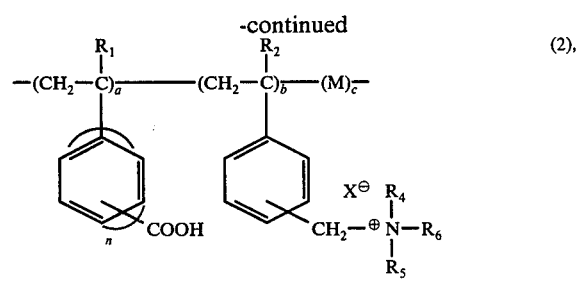

(2),

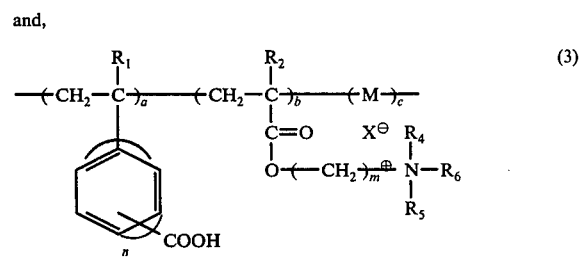

(3)

wherein $R_1$ and $R_2$ represent hydrogen or alkyl of 1 to 4 carbon atoms; $R_3$ is $-CH_2-C(R)=CH_2$, $-(CH_2)_m COOC(R)=CH_2$, $-(CH_2)_m COOCH_2-C(R)=CH_2$, or $-(CH_2)_m O-C(R)=CH_2$, $-(CH_2)_m O-CH_2-C(R)=CH_2$ or

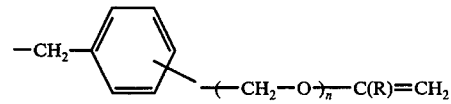

wherein R is hydrogen or methyl, m is a number from 1 to 3 and n is 0 or 1; at least one of $R_4$, $R_5$ and $R_6$ is $-CH_2-C(R)=CH_2$, $-(CH_2)_m COOC(R)=CH_2$, $-(CH_2)_m COOCH_2OC(R)=CH_2$, $-(CH_2)_m O-C(R)=CH_2$, $-(CH_2)_m O-CH_2-C(R)=CH_2$, $-(CH_2)_m CONH-C(R)=CH_2$ or

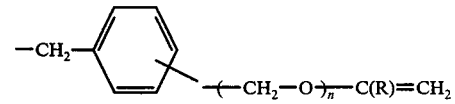

wherein R is hydrogen or methyl, m is a number from 1 to 3 and n is 0 or 1; the remaining $R_4$, $R_5$ and $R_6$ groups represent alkyl or alkylol groups of 1 to 4 carbon atoms; b is an integer of 10 to 20,000; a/b is in a range of 0.01 to 2; c/b is in a range of 0 to 3; X is halogen or hydroxyl, and M is a vinyl monomer and/or a monomer having an ethylenic double bond, with a highly electrolytic polyanion dissolved in water or a mixed solvent of water and at least one member selected from the group consisting of water-miscible acids and organic solvents.

13 Claims, No Drawings

PROCESS FOR PREPARING POLYCATION-POLYANION ELECTROLYTE COMPLEXES HAVING CARBOXYLIC ACID AND ALKENYL RADICAL SUBSTITUENTS AND FILMS THEREOF

BACKGROUND OF THE INVENTION

Field of the Invention

The present invention relates to a process for the preparation of novel polymeric electrolytes known as polyion complexes (hereinafter abbreviated as PIC) which have carboxyl groups and terminal unsaturated groups containing a double bond, and to a process for preparing films from these polyion complexes.

Moreover particularly, the present invention relates to a process for the preparation of polyion complexes by reacting at least one polymer represented by one of the following three formulas:

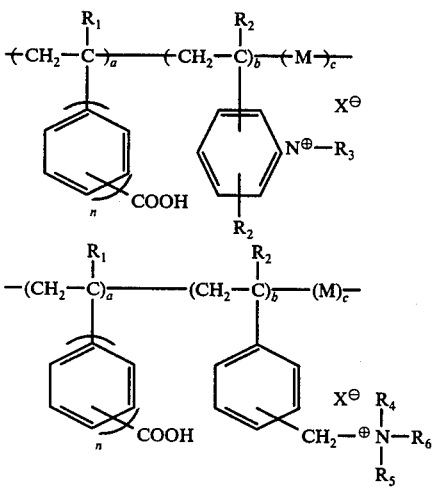

and, wherein $R_1$ and $R_2$ represent hydrogen or alkyl of 1 to 4 carbon atoms; $R_3$ is $-CH_2-C(R)=CH_2, -(CH_2)_m-COOC(R)=CH_2, -(CH_2)_m-COOCH_2-C(R)=CH_2$, or $-(CH_2)_m-O-C(R)=CH_2, -(CH_2)_m-O-CH_2-C(R)=CH_2$ or

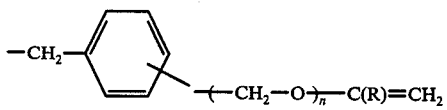

wherein R is hydrogen or methyl, $m$ is a number from 1 to 3 and $n$ is 0 or 1; at least one of $R_4$, $R_5$ and $R_6$ is $-CH_2-C(R)=CH_2, -(CH_2)_m-COOC(R)=CH_2, -(CH_2)_m-COOCH_2OC(R)=CH_2, -(CH_2)_m-O-C(R)=CH_2, -(CH_2)_m-O-CH_2-C(R)=CH_2, -(CH_2)_m-CONH-C(R)=CH_2$ or

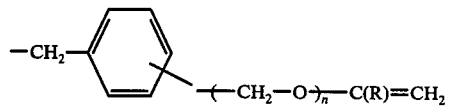

wherein R is hydrogen or methyl, $m$ is a number from 1 to 3 and $n$ is 0 or 1; the remaining $R_4$, $R_5$ and $R_6$ groups represent alkyl or alkylol groups of 1 to 4 carbon atoms; $b$ is an integer of 10 to 20,000; $a/b$ is in a range of 0.01 to 2; $c/b$ is in a range of 0 to 3;

X represents halogen or hydroxyl, and M is an aromatic vinyl monomer such as styrene or a substituted styrene, e.g., alpha-methylstyrene, a nitrogen-containing heterocyclic monomer such as vinylpyridine, an aliphatic vinyl monomer, a vinyl monomer which does not form a polymeric electrolyte, such as acrylic acid, its ester or acrylonitrile, or a monomer having an ethylenic double bond, such as butadiene with a highly electrolytic polyanion to form a complex; and a process for preparing films from PIC prepared by the above process.

DETAILED DESCRIPTION OF THE PREFERRED EMBODIMENTS

The polyion complex of the present invention can be used in the formation of ultrafiltration membranes, as resins for production of dialytic membranes, ion exchange resins, surface active agents, coating materials, ion exchange membranes and as medical materials for production of artificial lungs and the like. Since the polyion complex of the present invention has both carboxylic acid and unsaturated groups, when it is used in the production of ultrafiltration or dialytic membranes, the resulting membranes possess improved properties in several aspects over conventional polyion complex membranes.

The polyion complex of the present invention possesses the following excellent characteristics:

(1) Since a hydrogen bond-forming group is present in the polyion complex, if the PIC is formed into a film, the properties of the film such as water permeability and strength, are enhanced. The PIC of the present invention contains carboxylic acid groups which readily form hydrogen bonds in addition to ionic bonds, when it is formed into a film or membrane, and as a result, products of very high strength can be attained.

(2) In the conventional process for the production of carboxylic acid groups containing PIC, the anion portion which participates in the formation of the ionic bond is of the weak acid type in many cases, and hence, the resulting PIC possesses insufficient strength and the like. In the polyion complex of the present invention, an anion portion of the strong acid type can be used. Because of these characteristics, the ionic bond can be reinforced and a membrane or film having an enhanced strength can be prepared from the PIC of the present invention.

(3) In the polymer that is used in the present invention, the carboxylic acid content can be adjusted as desired by changing the polymerization conditions, or the like appropriately. Therefore, the amount of the carboxylic acid in the PIC can be adjusted as desired and such factors as the ionic density and theionic spacing can be freely changed chemically.

(4) Since the present polyion complex contains unsaturated groups, it can be cross-linked by a physical treatment such as, for example, by exposure to light, heat or high energy irradiation such as ultraviolet rays in the presence of a radical initiator, an ion initiator or a sensitizer, without using a chemical cross-linking agent. The cross-linking density of the polyion complex can be enhanced by such physical treatment.

The films and membranes prepared from the PIC of the present invention have the same characteristics as described above.

The polyion complex of the present invention is characterized by a structure of a polymer simultaneously containing a carboxylic acid and a cation portion which includes an unsaturated group, or a polymer which contains another vinyl monomer in addition to the carboxylic acid and cation portion components.

The polyanion which is reacted with the above polymer to prepare the polyion complex is not particularly critical, with the only requirement being that the polyanion should be a highly electrolytic polyanion. Suitable preferred examples of the polyanion reactant include homopolymers and copolymers of alkali metal or alkaline earth metals salts of styrene-sulfonic acid, vinylsulfonic acid and vinyltoluenesulfonic acid.

As pointed out above, the polyanion that is used in the present invention is not particularly critical, so far as it is a highly electrolytic polyanion. However, it is necessary that the polycation polymer which contains a carboxylic acid and a cation portion containing an unsaturated group in the molecule should be used as the polycation component.

The PIC of the present invention can be prepared by dissolving a polymer represented by any one of the above formulas (1) to (3) and a highly electrolytic polyanion in suitable solvents separately and then mixing both of the solutions.

Suitable solvents which can be used in the present invention include water and at least one member selected from the group of water-miscible acids and organic solvents. Suitable specific organic solvents include methanol, ethanol, acetone, tetrahydrofuran, N,N-dimethylformamide and N,N-dimethylacetamide singly and mixtures thereof. Suitable water-miscible acids include hydrochloric acid, sulfuric acid and nitric acid singly and in mixtures thereof. When both the polymeric components are dissolved in a solvent and both the solutions are mixed, the polyion complex of the present invention is formed. In this case, the cation portion of the polymer has formula (1), (2) or (3) and the highly electrolytic polyanion portion participate in the formation of the ionic bonds in the molecule. Accordingly, the carboxylic acid groups can remain in the resulting polyion complex as they are.

The polyion complex of the present invention can also be prepared by adding one polymeric component as a solid to a solution of the other polymeric component. This method of mixing, however, is not as preferable because the composition of the resulting polyion complex is often heterogeneous, the reproducibility is not good and a long time is required to purify the product.

When separate solutions of the reactants are mixed and reacted, the concentration of each reactant may be selected within the range of 0.01 to 80% by weight, preferably 0.1 to 30% by weight. The reaction temperature can be within the range of 0° to 90° C, but it is preferred that the reaction be conducted at a temperature in the range of room temperature to 50° C. The equivalent ratio of the cation portion to the anion portion is in the range of 0.05 to 20.

In order to prepare casting solutions for the preparation of polyion complex shaped articles such as PIC membranes and PIC films, and polyion complex can be dissolved in a mixed solvent of at least three components, i.e., water, a water-miscible organic solvent and an acid, base or salt. Suitable organic solvents which are useful for this purpose include alcohols, cyclic ethers, ketones, nitrogen-containing polar solvents and sulfur-containing polar solvents. More specifically, useful solvents include at least one member from the group of methanol, ethanol, N,N-dimethylformamide, N,N-dimethylsulfoxide, acetone, tetrahydrofuran, dioxane, cyclohexanone, acetonitrile and the like. With regard to the other components of the solvent system, that is the acid, base or salt, suitable examples include such acids as hydrochloric acid, sulfuric acid, nitric acid and hydrobromic acid; alkali metal hydroxide bases such as sodium hydroxide and potassium hydroxide; alkali metal and alkaline earth metal halides such as sodium chloride, sodium bromide, potassium bromide and calcium chloride and the nitrates, sulfates, perchlorates and persulfates thereof. Especially preferred as a three-component solvent are water-acetone-sodium bromide and water-acetone-sodium chloride.

In conventional PIC films, since the strength of the films is derived merely from the ionic bonding of cations and anions, the film strength and other properties of the film are insufficient. The films prepared from the polyion complex of the present invention, however, have overcome or at least moderated the deficiencies of the conventional PIC films.

Normally, the casting solution is prepared by dissolving the present PIC in the above-mentioned three-component solvent at a concentration of 5 to 80% by weight, preferably, 10 to 60% by weight. It is also possible to use as a casting solution a solution formed by dissolving the above-mentioned polycation polymer and a highly electrolytic polyanion as the starting materials of the present PIC in a solvent.

An example of the present process for preparing films will now be described. A casting solution prepared in the above-mentioned manner is cast onto a smooth plate of glass, Teflon or polyethylene terephthalate to the desired thickness and is then dried. The drying temperature is 0 to 90° C, preferably room temperature to 50° C. The drying time is 1 to 2 minutes.

PIC films can be prepared by processes other than the above-mentioned casting process such as, for example, by a pressing process in which a solution of the PIC in the above-mentioned three-component solvent is spread between two or more plates and the assembly is subjected to press molding, according to need under application of heat. Another example of a process is one in which a casting solution such as mentioned above is coated on a porous support. Yet another example of a process is one in which a porous support is immersed in a casting solution such as mentioned above in order to support the resulting film on the support. Suitable supports include for example, fabrics and nets of synthetic fibers such as polyester fibers, e.g., Tetron fibers; polyvinyl chloride fibers, e.g., Teviron fibers; and vinylidene chloride fibers, e.g., Saran fibers; and inorganic fibers such as glass and asbestos fibers.

The PIC which is supported on a smooth plate or support is immersed in water or a mixed solvent of water and a water-miscible organic solvent at 0° to 80°

C, preferably 20° to 50° C. The time of immersion is 1 minute to 10 hours.

The PIC which is cast on the smooth plate can be peeled from the smooth plate after the lapse of a certain period of time to yield a PIC film. The PIC film supported on the support has a good bonding strength to the support.

The PIC film thus formed can be cross-linked by subjecting the film to heat, light or high energy radiation through the unsaturated groups in the molecule. For example, if a radical initiator such as alpha,alpha-azobisisobutyronitrile is incorporated into the casting solution, the resulting film can be cross-linked by heat. On the other hand, if a light sensitizer such as benzophenone is incorporated in the casting solution, the resulting film can be cross-linked by subjecting the film to ultraviolet rays or the like.

Good results are obtained when cross-linking is conducted at room temperature to 100° C for 1 to 10 hours.

Since the specific polymer of the present invention is used in film manufacture, the PIC films of the present invention are characterized by containing both an unsaturated group and a carboxylic acid moiety. PIC films prepared by the procedure of the present invention enjoy wide use as materials for the production of dialytic membranes, ultrafiltration membranes, artificial lungs, protective coatings and ion exchange membranes.

Having generally described the invention, a more complete understanding can be obtained by reference to certain specific examples, which are provided herein for purposes of illustration only and are not intended to be limiting unless otherwise specified.

EXAMPLE 1

In 1000 ml of distilled water was dissolved 10 g of a polymer (having a molecular weight of $4.8 \times 10^5$) having the formula:

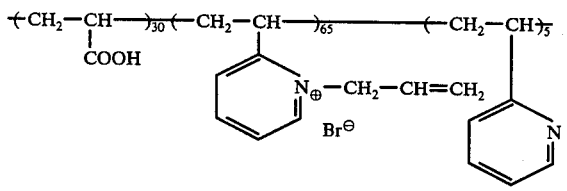

and the pH of the solution was adjusted to 3 (with 10% hydrochloric acid). Separately, 7 g of sodium polystyrenesulfonate (having a molecular weight of $4.2 \times 10^5$) were dissolved in 800 ml of distilled water. Both of the solutions were mixed at room temperature with agitation, and a white precipitate formed as the solutions were mixed. Both of the solutions were mixed over a period of about 1 hour, and after complete mixing, agitation was continued for about 2 hours and the mixture was allowed to stand overnight. The white precipitate which formed was recovered by filtration, washed sufficiently with distilled water, washed with methanol and then dried in a vacuo. In the infrared absorption spectrum of the product, absorption bands were observed corresponding to carboxylic acid and the $SO_2$ group at 1710 $cm^{-1}$ and 1200–1030 $cm^{-1}$ respectively. These observations that a PIC was formed which contained free carboxylic acid groups. The yield was 11.2 g. The PIC which formed dissolved well in water-acetone-NaBr (60:20:20) and water-dioxane-N,N-dimethylsulfoxide-concentrated hydrobromic acid (17:17:17:60).

EXAMPLE 2

Reaction and post treatment steps were performed in the same manner as described in Example 1 except that 200 ml of methanol was added to each of the distilled water solutions of reactants. The resulting PIC was the same as PIC obtained in Example 1.

EXAMPLE 3

In 1200 ml of distilled water was dissolved 15 g of a polymer (having a molecular weight of $7.9 \times 10^6$) having the following formula:

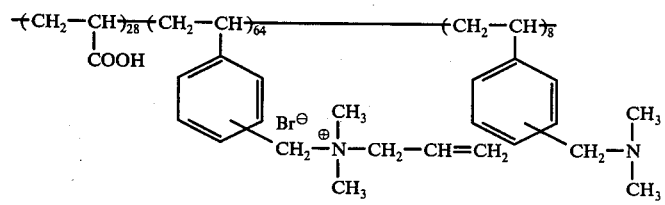

and the pH of the solution was adjusted to 2.5 with 10% hydrochloric acid. Separately, 10 g of sodium polystrene sulfonate (having a molecular weight of $6.7 \times 10^6$) was dissolved in 1000 ml of distilled water. Both the solutions were mixed at room temperature with agitation, and a white precipitate formed as the solutions were mixed. Both of the solutions were mixed over a period of about 1.5 hours, and after complete mixing, agitation was continued for about 2 hours and the mixture was allowed to stand overnight. The white precipitate which formed was recovered by filtration, washed with distilled water sufficiently, washed with methanol and then dried in vacuo. In the infrared absorption spectrum of the product, absorption bands were observed corresponding to the carboxylic acid and the $SO_2$ group at 1710 $cm^{-1}$ and 1200–1030 $cm^{-1}$, respectively.

The yield was 19.4 g. The PIC which formed dissolved well in water-acetone-NaBr (60:20:20) and water-acetone-NaCl (51:18:31).

EXAMPLE 4

In 2000 ml of distilled water was dissolved 16g of a polymer (having a molecular weight of $2.7 \times 10^5$) having the formula:

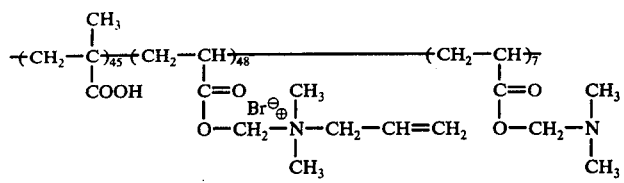

Separately, 7 g of sodium polyvinyl-sulfonate (having a molecular weight of $4.7 \times 10^3$) were dissolved in 800 ml of distilled water. Both of the solutions were mixed at room temperature with agitation over a period of about 2 hours. After completion of mixing, agitation was continued for about 2 hours and the mixture was allowed to stand overnight. The white precipitate which formed was recovered by filtration, washed with distilled water sufficiently, washed with methanol and then dried in vacuo. The yield was 11.2 g. The structure was confirmed by infrared absorption spectrum. The PIC which formed dissolved well in water-acetone-NaBr (51:18:31).

Solutions (a) and (b) and the sodium polystyrene-sulfonate solution were reacted and the PIC obtained was treated in the same manner as described in Example 1. The structural details of each PIC obtained were confirmed by its infrared absorption spectrum. The yields were 18.5 g [solution (a)] and 19 g [solution (b)].

Each of the PIC products obtained dissolved well in water-acetone-NaBr (60:20:20 or 51:18:31).

EXAMPLE 6

In 1000 ml of distilled water was dissolved 15 g of a polymer (having a molecular weight of $7.9 \times 10^6$) having the formula:

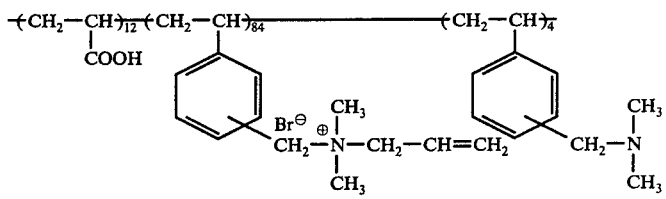

EXAMPLE 5

In 1500 ml of distilled water was dissolved 13 g of a polymer (having a molecular weight of $6.2 \times 10^6$) having the formula:

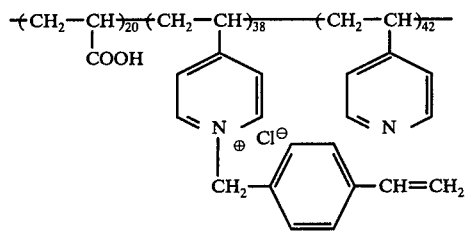

and the pH of the solution was adjusted to 2.5 with 10% hydrochloric acid [solution (a)].

In 2000 ml of distilled water was dissolved 15 g of a polymer (having a molecular weight of $5.3 \times 10^5$) having the formula:

and the pH of the solution was adjusted to 2.5 with 10% hydrochloric acid. Separately, 10 g of sodium polystyrene-sulfonate (having a molecular weight of $6.7 \times 10^6$) was dissolved in 1000 ml of distilled water. Both of the solutions were mixed at room temperature with agitation, and a white precipitate formed as the solutions were mixed. Both of the solutions were mixed over a period of about 1.5 hours, and after complete mixing, agitation was continued for about 2 hours and the mixture was allowed to stand overnight. The white precipitate which formed was recovered by filtration, washed with distilled water sufficiently, washed with methanol and then dried in vacuo. In the infrared absorption spectrum of the product, absorption bands were observed corresponding to the carboxylic acid and the $SO_2$ group at 1710 cm$^{-1}$ and 1200–1030 cm$^{-1}$, respectively.

The yield was 19.0 g. The PIC which formed dissolved well in water-acetone-NaBr (51:18:31).

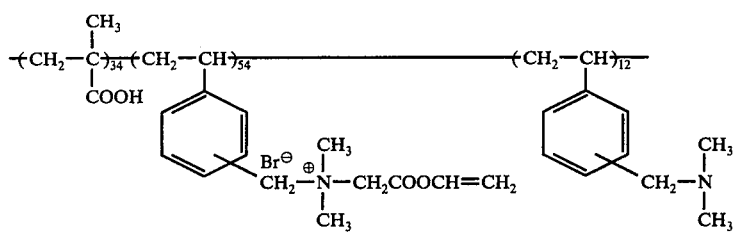

and the pH of the solution was adjusted to 2.5 with 10% hydrochloric acid [solution (b)].

Separately, 8 g of sodium polystyrene-sulfonate (having a molecular weight of $4.2 \times 10^5$) was dissolved in 1000 ml of distilled water.

EXAMPLE 7

The PIC obtained in Example 6 was dissolved in a three-component solvent of water-acetone-sodium bromide (51:18:31) at a concentration of 20% by weight. The thus prepared casting solution was cast onto a smooth glass plate having a size of 15 cm × 15 cm in a uniform thickness. The solvent was evaporated at room temperature for 1 hour, and the coated plate was quietly immersed in water for 5 minutes. The PIC film was peeled from the glass plate, and it was further immersed in water for 2 hours. The PIC film obtained was characterized by a water content of 81.7%, a thickness of 0.198 mm and a water permeability of 0.423 ml/min-cm² (under 1 Kg/cm² pressure).

EXAMPLE 8

A PIC film was prepared in the same manner as described in Example 7, except that the PIC concentration was changed to 25% by weight.

The resulting PIC film was characterized by a water content of 78.2%, a thickness of 0.201 mm and a water permeability of 0.248 ml/min-cm² (under 1 Kg/cm² pressure).

EXAMPLE 9

A PIC film was prepared in the same manner as described in Example 7, except that the PIC concentration was changed to 30% by weight.

The resulting PIC film was characterized by a water content of 74.2%, a thickness of 0.251 mm and a water permeability of 0.021 ml/min-cm² (under 1 Kg/cm² pressure).

EXAMPLE 10

A PIC film was prepared in the same manner as described in Example 7, except that the PIC film prepared by using the solution (a) in Example 5 was used.

The resulting PIC was characterized by a water content of 74.7%, a thickness of 0.245 mm and a water permeability of 0.082 ml/min-cm² (under 1 kg/cm² pressure).

COMPARATIVE EXAMPLE 1

In 1500 ml of distilled water was dissolved 9 g of a polycation polymer (having a molecular weight of 2.7 × 10⁴ and a quaternization degree of 83%) having the formula:

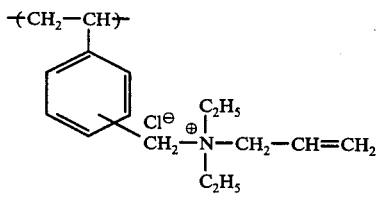

to form a homogeneous solution. Separately, 7 g of sodium polystyrene-sulfonate (having a molecular weight of 6.7 × 10⁶) was dissolved in 2000 ml of distilled water with agitation to form a homogeneous solution. The sodium polystyrene-sulfonate solution was added dropwise to the polycation polymer solution, and a white precipitate formed as the solutions were mixed. After completion of addition of the solution, agitation was continued for about 1 hour. The white precipitate which formed was recovered by filtration, washed with water sufficiently, washed with methanol and then dried in vacuo. Elemental analysis of the product showed that the PIC which formed was neutral.

The thus obtained PIC was dissolved in a three-component solvent of water-acetone-sodium bromide (51:18:31) at a concentration of 30% by weight and the prepared casting solution was cast onto a smooth glass plate having a size of 15 cm × 15 cm in a uniform thickness. The solvent was evaporated at room temperature for 30 minutes, and the coated plate was quietly immersed in water for 5 minutes. The PIC film was peeled from the glass plate, and then further immersed in water for 2 hours.

EXAMPLE 11

The PIC film obtained in Example 7 was immersed in 0.5 N NaCl and allowed to stand overnight to equilibrate the film sufficiently. Then, the film was placed between semi-cells. One surface of the film was contacted with 0.5N NaCl and the other surface was contacted with 2.5 N NaCl. From the membrane voltage (Em) generated between the two cells, the cation transport number ($\bar{t}_+$) in the membrane was calculated according to the following equation;

$$\bar{t}_+ = \frac{1}{2} + \frac{Em}{2\frac{RT}{F}\ln\frac{a_2}{a_1}}$$

wherein R stands for the universal gas constant, F stands for Faraday's constant, T designates the measurement temperature (° K), and $a_1$ and i $a_2$ are sodium chloride activities in cells 1 and 2, respectively. The cation transport number of the above film was 0.6. The cation transport number of the film of Comparative Example 1 calculated in the same manner as above was 0.5.

EXAMPLE 12

The PIC obtained in Example 1 was dissolved in a three-component solvent of water-acetone-sodium bromide (60:20:20) at a concentration of 40% by weight to form a uniform solution. Benzophenone was added to the solution, and the mixture was coated on a Saran net (70 mesh), dried at room temperature for 1 minute and immersed in water. A white film formed immediately. The water content was 78.4%.

EXAMPLE 13

The PIC film obtained in Example 12 was exposed to radiation from a high pressure mercury lamp for 4 hours in water maintained at 60° C. When the resulting PIC film was dissolved in water-acetone-NaBr (60:20:20), a soluble substance and an insoluble substance were obtained in the following ratio. For comparison, the data obtained with respect to the non-irradiated sample are also shown.

|  | Soluble Portion (%) | Insoluble Portion (%) |
| --- | --- | --- |
| untreated sample | 100 | 0 |
| treated sample | 21 | 79 |

From the above results, it is apparent that the irradiated film was cross-linked.

EXAMPLE 14

A 7% by weight aqueous solution of a polycation polymer having the formula:

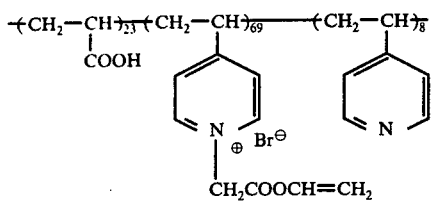

was reacted with a 5% by weight aqueous solution of sodium polystyrene-sulfonate (having a molecular weight of 2.6 × 10$^6$) in the same manner as described in Example 1 to obtain a polyion complex. The PIC thus obtained was dissolved in a three-component solvent of water-acetone-sodium bromide (60:20:20) at a concentration of 45% by weight to form a uniform solution. Then, the solution was uniformly coated on a Saran net, dried at room temperature for 2 minutes and immersed in water. Immediately, a white film formed. The water content of the film was 74.7%.

EXAMPLE 15

In 2000 ml of distilled water was dissolved 20 g of a polymer (having a molecular weight of 3.2 × 10$^5$) having the formula:

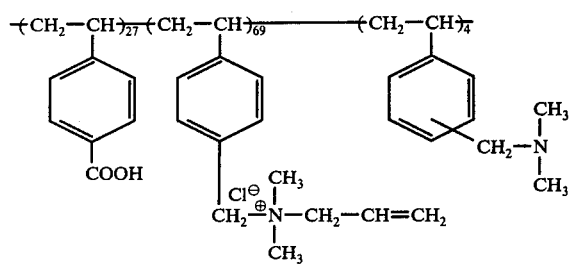

and the pH of the solution was adjusted to 3 with 10% hydrochloric acid. Separately, 5 g of sodium polyvinyl-sulfonate (having a molecular weight of 4.1 × 10$^3$) was dissolved in 500 ml of distilled water. Both of the solutions were violently mixed at room temperature.

The white precipitate which formed was recovered by filtration and dried in vacuo. In the infrared absorption spectrum of the product, absorption bands were observed corresponding to the carboxylic acid and the $SO_2$ group at 1702 cm$^{-1}$ and 1200–1030 cm$^{-1}$, respectively. The yield was 21.4 g. The PIC which formed dissolved well in water-acetone-NaBr (51:18:31) and water-methanol-NaCL (60:20:20).

EXAMPLE 16

The PIC obtained in Example 15 was dissolved in a three-component solvent of water-acetone-sodium bromide (51:18:31) at a concentration of 20% by weight. The casting solution thus prepared was cast onto a smooth glass plate having a size of 15 cm × 15 cm in a uniform thickness. The solvent was evaporated at room temperature for 1 hour, and the coated plate was quietly immersed in water for 10 minutes. The PIC film was peeled from the glass plate, and further immersed in water for 2 hours. The PIC film obtained was characterized by a water content of 83.4%, a thickness of 0.189 mm and a water permeability of 0.314 ml/min-cm$^2$ (under 1 Kg/cm$^2$ pressure).

Having now fully described the invention, it will be apparent to one of ordinary skill in the art that many changes and modifications can be made thereto without departing from the spirit or scope of the invention as set forth herein.

What is claimed as new and intended to be secured by letters patent is:

1. A process for the preparation of polymeric electrolyte complexes, which comprises:
reacting at least one polymer represented by one of the following formulas:

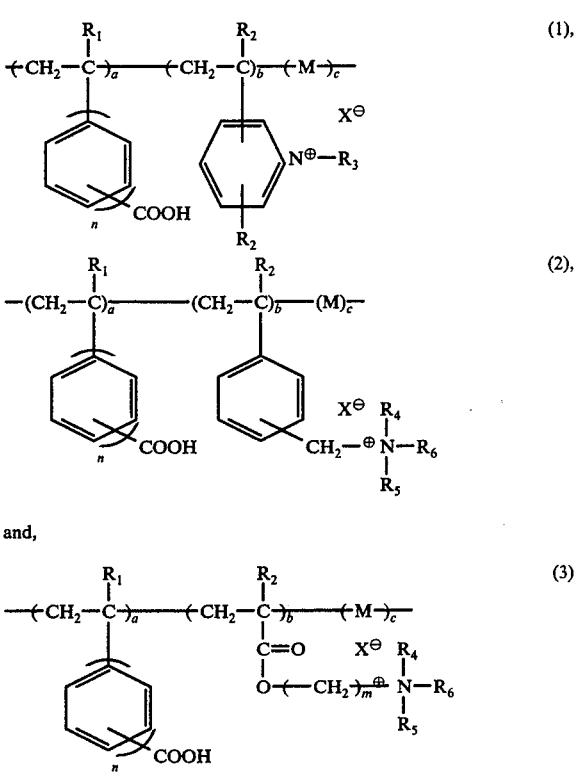

wherein $R_1$ and $R_2$ represent hydrogen or alkyl of 1 to 4 carbon atoms; $R_3$ is $-CH_2-C(R)=CH_2$, $+CH_2 +_m COOC(R)=CH_2$, $+OH_2+_m COOCH_2-C(R)=CH_2$, or $+CH_2+_m O-C(R)=CH_2+CH_2+_m O-CH_2-C(R)=CH_2$ or

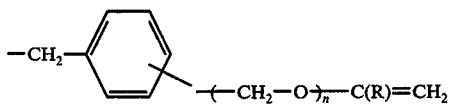

wherein R is hydrogen or methyl, m is a number from 1 to 3 and n is 0 or 1; at least one of $R_4$, $R_5$ and $R_6$ is $-CH_2-C(R)=CH_2, +CH_2+_m CO-OC(R)=CH_2$, $+CH_2+_m COOCH_2OC(R)=CH_2$, $+CH_2+_m O-C(R)=CH_2, +CH_2+_m O-CH_2-C(R)=CH_2, +CH_2+_m CONH-C(R)=CH_2$ or

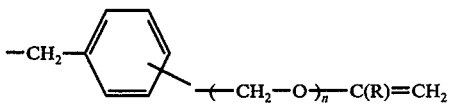

wherein R is hydrogen or methyl, m is a number from 1 to 3 and n is 0 or 1; the remaining $R_4$, $R_5$ and $R_6$ groups represent alkyl or alkylol groups of 1 to 4 carbon atoms; $b$ is an integer of 10 to 20,000, $a/b$ is in a range of 0.01 to 2; $c/b$ is in a range of 0 to 3; X is halogen or hydroxyl, and M is a vinyl monomer and/or a monomer having an ethylenic double bond, with a highly electrolytic polyanion dissolved in water or a mixed solvent of water and at least one member selected from the group consisting of water-miscible acids and organic solvents.

2. The process of claim 1, wherein said polyanion is a homopolymer or copolymer of an alkali metal or alkaline earth metal salt of styrenesulfonic acid, vinylsulfonic acid or vinyltoluenesulfonic acid.

3. The process of claim 1, wherein said water-miscible organic solvent is methanol, ethanol, acetone, tetrahydrofuran, N,N-dimethylformamide or N,N-dimethylacetamide and wherein said water-miscible acid is hydrochloric acid, sulfuric acid or nitric acid.

4. The process of claim 1, wherein the concentration of said polyanion and said polymer in said water or said mixed solvent ranges from 0.01 to 80% by weight.

5. The process of claim 1, wherein said reaction temperature ranges from 0° to 90° C.

6. The process of claim 1, wherein the equivalent ratio of the cationic portion of the polymer to the anion portion of the polyanion ranges from 0.05 to 20.

7. A process for the preparation of an uncross-linked polyion complex film, which comprises:
dissolving a polymeric electrolytic complex of claim 1 in a three component solvent of water, a water-miscible organic solvent and an acid, base or salt;
casting said solution of said polymeric complex onto a surface; and drying said cast solution thereby forming said film.

8. The process of claim 7, wherein said water-miscible organic solvent is an alchol, a cyclic ether, a ketone, a nitrogen-containing polar solvent or a sulfur-containing polar solvent; and wherein said acid is hydrochloric acid, hydrobromic acid, sulfuric acid or nitric acid; said base is an alkali metal hydroxide and said salt is an alkali metal or alkaline earth metal halide, nitrate, sulfate, perchlorate or persulfate.

9. The process of claim 7, wherein the concentration of said polymeric complex in said solvent system ranges from 5 to 80% by weight.

10. The process of claim 7, wherein said cast film is dried at a temperature of 0° to 90° C.

11. A process for the preparation of a cross-linked polyion complex film, which comprises:
dissolving a polymeric electrolyte complex of claim 1 and a radical initiator or a sensitizer in a three component solvent of water, a water-miscible solvent and an acid, base or salt;
casting said solution of said polymeric complex onto a surface;
drying said cast solution into a film; and
effecting cross-linking of said film by subjecting said film to heat, light or high energy radiation.

12. The process of claim 11, wherein said film is cross-linked at a temperature from room temperature to 100° C for 1 to 10 hours.

13. A polyion complex prepared by the process of claim 1.

* * * * *